US008127541B2

(12) United States Patent
Satake

(10) Patent No.: US 8,127,541 B2
(45) Date of Patent: Mar. 6, 2012

(54) WORKING FLUID COOLING CONTROL SYSTEM FOR CONSTRUCTION MACHINE

(75) Inventor: Hidetoshi Satake, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 483 days.

(21) Appl. No.: 12/064,930

(22) PCT Filed: Sep. 14, 2006

(86) PCT No.: PCT/JP2006/318271

§ 371 (c)(1),
(2), (4) Date: Feb. 26, 2008

(87) PCT Pub. No.: WO2007/034734

PCT Pub. Date: Mar. 29, 2007

(65) Prior Publication Data

US 2009/0148310 A1 Jun. 11, 2009

(30) Foreign Application Priority Data

Sep. 20, 2005 (JP) ................................ 2005-271412

(51) Int. Cl.
*F16D 31/02* (2006.01)

(52) U.S. Cl. ............................... 60/329; 60/445; 60/456

(58) Field of Classification Search .................... 60/329, 60/456

See application file for complete search history.

(56) References Cited

FOREIGN PATENT DOCUMENTS

| | | |
|---|---|---|
| JP | 60-044604 | 3/1985 |
| JP | 62-188806 | 8/1987 |
| JP | 62-196409 | 8/1987 |
| JP | 6-23874 | 3/1994 |
| JP | 07-091409 | 4/1995 |
| JP | 7-331707 | 12/1995 |
| JP | 2565113 | 9/1997 |
| JP | 11-100869 | 4/1999 |
| JP | 2000-110560 | 4/2000 |
| JP | 2003-004005 | 1/2003 |
| JP | 2003-049803 | 2/2003 |
| JP | 2005-036881 | 2/2005 |

*Primary Examiner* — Daniel Lopez
(74) *Attorney, Agent, or Firm* — Mattingly & Malur, PC

(57) ABSTRACT

A working fluid cooling control system has a controller 100 that receives inputs signals from a traveling motor speed pickup 101, a pressure sensor 102, a signal receiving line 103*a* of an option selecting switch 103 and a temperature sensor 104. The controller performs predetermined arithmetic processing and controls proportional solenoid valves 105 and 106. The pressures controlled by the solenoid valves are compared with positive control command pressures in shuttle valves 109 and 110. In this way, in the case of an operation pattern corresponding to a rise in temperature of the working fluid, minimum tilting angles of hydraulic pumps 11 and 12 are increased to increase an average flow rate of the working fluid passing through an oil cooler 40, thereby increasing an average heat discharge amount and reducing an equilibrium temperature of the working fluid.

7 Claims, 8 Drawing Sheets

WORKING FLUID COOLING CONTROL SYSTEM FOR CONSTRUCTION MACHINE

TECHNICAL FIELD

The present invention relates to a working fluid cooling control system for a construction machine comprising a variable displacement type hydraulic pump, plural members to be operated by the hydraulic pump, and a heat exchanger for cooling working fluid (working oil) as an operating medium.

BACKGROUND ART

In a conventional construction machine, especially a conventional hydraulic excavator or the like, the specifications of a cooling system including a heat exchanger as a cooler for working fluid are optimized so as to ensure a heat balance of a prime mover, a hydraulic system, etc. on the basis of standard operations using a bucket. In this case, in the states of operations performed under severer conditions than in standard operations, such as, for example, a continuous high-load operation, an operation performed in a place of a very high ambient temperature such as in a tunnel, or an operation performed with the construction machine deteriorated, the heat balance is lost, which increases the temperature of the hydraulic system and adversely affects the machine lives of hydraulic devices.

However, if the specifications of the cooling system are optimized beforehand so as to ensure a heat balance under severer conditions than in standard operations such as, for example, a continuous high-load operation, not only the problem of overengineering occurs relative to the standard operations most frequent in general use, but also it is uneconomical. If the capacity of the heat exchanger is increased as a countermeasure, the entire cooling system becomes larger in size, leading to an increase of cost and an increase in size of the construction machine concerned, or the problem may arise that the noise level becomes higher because the cooling air volume needs to be increased.

In connection with such problems, JP-A-2000-110560 discloses a technique wherein the number of revolutions of a cooling fan is controlled in a variable manner to suppress noise during standard operations, and the heat discharge amount of a cooler is increased when the operation is performed in a severer condition than in standard operations.

According to a technique disclosed in Japanese Utility Model Registration No. 2565113, in a working machine wherein when a control lever is in a neutral state (unoperated state), a cooling fan is rotated by a manual operation by an operator and working fluid is cooled by a cooler, the capacity of a variable displacement type hydraulic pump is maximized upon detection of the neutral state of the control lever and the manual operation by the operator, thereby increasing the flow rate of the working fluid passing through the cooler so as to maximize the heat discharge amount of the cooler.

Patent Literature 1: JP, A 2000-110560

Patent Literature 2: Japanese Utility Model Registration No. 2565113

DISCLOSURE OF THE INVENTION

Problems to be Solved by the Invention

However, basically in all of the above conventional techniques, after increase in temperature of the working fluid, the increased temperature is reduced by the cooler; thus, the influence of such an increase in temperature is unavoidable although the increase may be temporary. Consequently, the deterioration of sealing parts occurs due to a rise of the oil temperature, or the increase in wear of sliding parts occurs due to the lowering in viscosity of the working fluid, thus giving rise to the problem of failures of hydraulic devices or shortened machine lives thereof.

In the conventional technique disclosed in JP-A-2000-110560, the cooling performance is improved by increasing the air volume, and a constant worsening of noise is unavoidable when a continuous operation is performed under severer conditions than in standard operations.

In the conventional technique disclosed in Japanese Utility Model Registration No. 2565113, the capacity of the variable displacement type hydraulic pump is switched to the maximum capacity when the control lever is in its neutral state. Problems are encountered therein such as a worsening of fuel efficiency and an increase in the amount of heat generated due to an increase of pressure loss in an unoperated state. Moreover, in the event the operator should operate the control lever carelessly without changing the cooler to an OFF state, it follows that the system starts with the capacity of the hydraulic pump changed to the maximum, so a starting shock occurs. Further, since the cooler is switched to an ON state by manual operation of the operator, there is also a problem with ease of use (operability).

It is an object of the present invention to provide a working fluid cooling control system for a construction machine wherein the cooling performance is improved before a rise in temperature of working fluid to prevent a rise in temperature of the working fluid whereby reduced failures of hydraulic devices and improved machine lives thereof can be achieved and a worsening of noise and of fuel efficiency can further be prevented.

Means for Solving the Problems (1) To achieve the above-mentioned object, the present invention provides a working fluid cooling control system for a construction machine having a variable displacement type hydraulic pump, a plurality of members to be operated by the hydraulic pump, and a heat exchanger for cooling a working fluid as an operating medium, wherein the capacity of the hydraulic pump is decreased to a preset minimum capacity when the plural members to be operated enter an unoperated state, the working fluid cooling control system comprising first detection means for detecting an operation pattern corresponding to a rise in temperature of the working fluid from among operation patterns associated with the plural members to be operated and pump flow rate increasing means which on the basis of the operation pattern detected by the first detection means increases the minimum capacity of the hydraulic pump to increase an average flow rate of the working fluid passing through the heat exchanger.

By thus providing the first detection means and the pump flow rate increasing means to detect an operation pattern corresponding to a rise in temperature of the working fluid, to increase the minimum capacity of the hydraulic pump, and to increase an average flow rate of the working fluid passing through the heat exchanger, it becomes possible to predict a temperature rise of the working fluid, increase an average heat discharge amount of the heat exchanger (improve the cooling performance) beforehand (before the temperature rise of the working fluid), and reduce an equilibrium temperature of the working fluid. As a result, it becomes possible to prevent the occurrence of a temperature rise of the working fluid, diminish failures of the hydraulic devices and improve the machine lives thereof. Moreover, since the cooling performance is improved by increasing the minimum capacity of the hydraulic pump to increase an average flow rate of the working fluid passing through the heat exchanger, a worsening of noise does not occur, and it is possible to minimize a worsening of fuel efficiency.

(2) In the above (1), the first detection means detects, as the operation pattern corresponding to a rise in temperature of the working fluid, an operation state of a member having a higher frequency of heavy loading among the plural members to be operated.

Consequently, when the operation pattern corresponding to a rise in temperature of the working fluid airses during travel of the construction machine, it is detected, and this detection makes it possible to improve the cooling performance in advance.

(3) In the above (2), the first detection means detects, as the operation state of the to-be-operated member having a higher frequency of heavy loading, an operation signal of operation means for said member.

Consequently, when the operation pattern corresponding to a rise in temperature of the working fluid arises, for example, during the full operation of travel operation means, it is detected, and this detection makes it possible to improve the cooling performance in advance.

(4) In the above (2), the first detection means detects, as the operation state of the member with a higher frequency of heavy loading, an operation speed of said member.

Consequently, when the operation pattern corresponding to a rise in temperature of the working fluid airses, for example, during high-speed traveling, it is detected, and this detection makes it possible to improve the cooling performance in advance.

(5) In the above (1), the first detection means detects, as the operation pattern corresponding to a rise in temperature of the working fluid, an operation mode having a higher frequency of heavy loading from among operation modes associated with the plural members to be operated.

Consequently, when the operation mode corresponding to a rise in temperature of the working fluid, e.g., an operation mode using a crusher, arises, it is detected, and this detection makes it possible to improve the cooling performance in advance.

(6) In the above (5), the construction machine further has selector means for selecting an operation mode using such an attachment as a crusher or the like and other operation modes, and the first detection means detects the operation mode using a crusher as the operation mode having a higher frequency of heavy loading.

Consequently, when the operation mode using a crusher arises as the operation mode corresponding to a rise in temperature of the working fluid, it is detected, and this detection makes it possible to improve the cooling performance in advance.

(7) In the above (1), the working fluid cooling control system further comprises second detection means for detecting a temperature of the working fluid, and the pump flow rate increasing means increases the minimum capacity of the hydraulic pump on the basis of both the operation pattern detected by the first detection means and the temperature of the working fluid detected by the second detection means.

Consequently, even in the event the temperature of the working fluid should rise due to, for example, a worsening of the surrounding environment under the operation pattern not corresponding to a rise in temperature of the working fluid, it is possible to improve the cooling performance of the heat exchanger and thereby reduce the increased temperature of the working fluid.

(8) In the above (7), the pump flow rate increasing means comprises means for calculating a first minimum capacity on the basis of the operation pattern detected by the first detection means; means for calculating a second minimum capacity on the basis of the temperature of the working fluid detected by the second detection means; means for selecting the larger capacity of the first and second minimum capacities; and means for changing the minimum capacity of the hydraulic pump on the basis of the selected minimum capacity.

Consequently, the cooling performance of the heat exchanger is improved before a rise in temperature of the working fluid, whereby it is possible to prevent a rise in temperature of the working fluid. Besides, even in the event the temperature of the working fluid should rise due to, for example, a worsening of the surrounding environment under the operation pattern not corresponding to a rise in temperature of the working fluid, the cooling performance of the heat exchanger is improved; hence, it is possible to reduce the increased temperature of the working fluid.

(9) Further, to achieve the foregoing object, the present invention provides a construction machine comprising a plurality of variable displacement type hydraulic pumps; a plurality of members to be operated by the plural hydraulic pumps; and a heat exchanger for cooling a working fluid as an operating medium, the capacity of the plural hydraulic pumps being reduced to a preset minimum capacity when the plural members to be operated enter an unoperated state, characterized by further comprising first detection means for detecting an operation pattern corresponding to a rise in temperature of the working fluid from among operation patterns associated with the plural members to be operated; and pump flow rate increasing means which on the basis of the operation pattern detected by the first detection means increases the minimum capacity of at least one of the plural hydraulic pumps so as to increase an average flow rate of the working fluid passing through the heat exchanger.

Consequently, in the hydraulic system having plural hydraulic pumps, by the same effect as that described in the above (1), it becomes possible to predict a rise in temperature of the working fluid, increase an average heat discharge amount of the heat exchanger (improve the cooling performance) in advance (before the rise in temperature of the working fluid), and decrease the equilibrium temperature of the working fluid. As a result, it becomes possible to prevent the occurrence of a temperature rise of the working fluid, diminish failures of hydraulic devices and improve the machine lives thereof. Further, since the cooling performance is improved by increasing the minimum capacity of the hydraulic pumps and the average flow rate of the working fluid passing through the heat exchanger, neither a worsening of noise nor a worsening of fuel efficiency occurs.

(10) In the above (9), the first detection means detects, as the operation pattern corresponding to a rise in temperature of the working fluid, an operation pattern associated with a first to-be-operated member operated by one hydraulic pump out of the plural hydraulic pumps, and the pump flow rate increasing means increases the minimum capacity of the other hydraulic pump(s) than said one hydraulic pump on the basis of the operation pattern associated with the first to-be-operated member.

Consequently, when plural hydraulic pumps are used, it is possible to utilize an idle hydraulic pump(s) (the other hydraulic pump(s) than said one hydraulic pump) effectively, thereby improve the cooling performance of the heat exchanger, and prevent the occurrence of a temperature rise of the working fluid.

Effect of the Invention

According to the present invention it is possible to improve the cooling performance before a rise in temperature of the working fluid, thereby prevent the occurrence of a temperature rise of the working fluid, diminish failures of hydraulic devices, and improve the machine lives thereof. Moreover, since the cooling performance is improved by increasing the minimum capacity of a hydraulic pump(s) to increase an average flow rate of the working fluid passing through the heat exchanger, a worsening of noise does not occur and it is possible to minimize a worsening of fuel efficiency.

EXPLANATION OF REFERENCE NUMERALS

Figure 1:
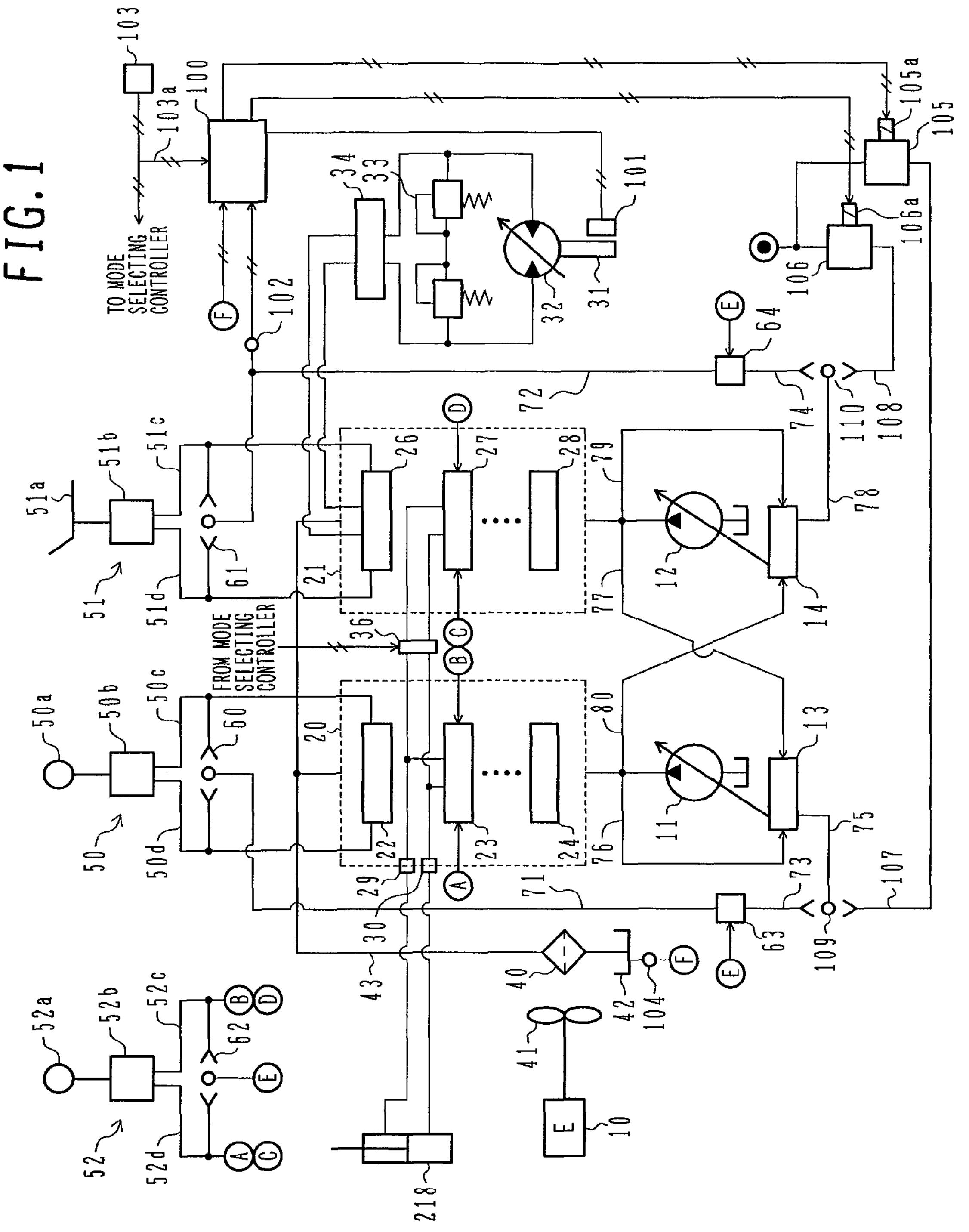
FIG. 1 illustrates a working fluid cooling control system for a construction machine according to an embodiment of the present invention, together with a hydraulic drive system.

10 engine
11, 12 hydraulic pump
13, 14 tilt control mechanism
20, 21 control valve group
22-24, 26-28 control valve
32 hydraulic motor
40 oil cooler
41 cooling fan
42 hydraulic oil tank
50 control lever device
51 traveling pedal device
52 control lever device
60, 61, 62 shuttle valve
63, 64 high pressure selecting valve block
100 controller
101 traveling motor speed pickup
102 pressure sensor
103 option selecting switch
104 temperature sensor

105, 106 proportional solenoid valve
109, 110 shuttle valve
202 lower travel structure
203 upper swing structure
204 front working device
207 blade
208 blade cylinder
211 boom
212 arm
213 bucket
214 boom cylinder
215 arm cylinder
216 bucket cylinder
217 crusher
218 actuator

BEST MODE FOR CARRYING OUT THE INVENTION

An embodiment of the present invention will be described hereinunder with reference to the drawings.

FIG. 1 illustrates a working fluid cooling control system for a construction machine according to an embodiment of the present invention, together with a hydraulic drive system (hydraulic system).

In FIG. 1, the hydraulic drive system includes two variable displacement type hydraulic pumps 11 and 12 and two control valve groups 20 and 21. The hydraulic pumps 11 and 12 are provided with tilt control mechanisms 13 and 14, respectively, for controlling respective tilting angles.

The control valve group 20 is made up of plural control valves including center bypass type control valves 22, 23 and 24 and is connected to the hydraulic pump 11. The control valve group 21 is made up of plural control valves including center bypass type control valves 26, 27 and 28 and is connected to the hydraulic pump 12. The control valves, which are connected to various hydraulic actuators constituting members to be operated, control the flow of hydraulic fluid discharged from the hydraulic pumps 11 and 12 to control the operation of the corresponding hydraulic actuators.

The control valve 22 of the control valve group 20 is for a boom, for example, and connected to a boom cylinder 214 (see FIG. 5) as a corresponding hydraulic actuator.

The control valve 26 of the control valve group 20 is for traveling and connected to a hydraulic motor 32 as a corresponding hydraulic actuator. A counterbalance valve 34 and a pair of crossover relief valves 33 are provided on a line which connects the control valve 26 and the hydraulic motor 32.

The control valve 23 of the control valve group 20 and the control valve 27 of the control valve group 21 are spare control valves, which are used with operating machine attachments (hereinafter referred to as option attachments) other than a bucket attached. Examples of option attachments include various attachments including a crusher and a breaker. When such option attachments are used, the hydraulic actuators of each option attachment are connected to the control valves 23 and 27 with use of connectors 29 and 30. FIG. 1 shows a case where a hydraulic cylinder 218 of a crusher is connected to the control valves 23 and 27. The crusher is an attachment which requires a high flow rate and a large horsepower. An option selecting switch 103 is provided for the use of such an attachment requiring a high flow rate and a large horsepower, e.g., a crusher. A confluence switching valve 36 is provided on the actuator line side of the control valves 23 and 27. The option selecting switch 103 is operation-mode switching means. When the option selecting switch 103 is pushed, a crushing mode is selected, and a mode selecting controller (not shown) transmits a switching signal to a confluence switching valve 36, thereby switching the confluence switching valve 36 to a confluence position (open position). As a result, delivery pressures from the hydraulic pumps 11 and 12 join together and the joined pressure is fed to the hydraulic cylinder 218 of the crusher. At the same time, a signal is fed from the mode selecting controller to a fuel injection volume controller (not shown), so that the number of revolutions of an engine 10 increases.

A control lever device 50 is provided as operation means for the boom control valve 22. A traveling pedal device 51 is provided as operation means for the traveling control valve 26. Further, a control lever device 52 for a crusher is provided as operation means for the spare control valves 23 and 27 which are used for the crusher.

The control lever device 50 has a control lever 50*a* and a pilot valve 50*b* and generates a control pilot pressure in either a pilot line 50*c* or 50*d* in accordance with the operative direction and amount of the control lever 50*a*. The control valve 22 is switched over by the control pilot pressure.

The traveling pedal device 51 has a traveling pedal 51*a* and a pilot valve 51*b* and generates a control pilot pressure in either a pilot line 51*c* or 51*d* in accordance with the operative direction and depressed amount of the traveling pedal 51*a*. The control valve 26 is switched over by the control pilot pressure.

The control lever device 52 for a crusher has a control lever 52*a* and a pilot valve 52*b* and generates a control pilot pressure in either a pilot line 52*c* or 52*d* according to the operative direction and amount of the control lever 52*a*. The control valves 23 and 27 are switched over by the pilot pressure.

Also, control lever devices similar to the control lever device 50 are provided for the other control valves 24 . . . and 28 . . . .

A shuttle valve 60 as means for detecting the operative amount of the boom is provided in the pilot lines 50*c* and 50*d* to which the pilot pressure of the control lever device 50 is outputted. A shuttle valve 61 as means for detecting the amount of travel operation is provided in the pilot lines 51*c* and 51*d* to which the pilot pressure of the traveling pedal device 51 is outputted. Further, a shuttle valve 62 as means for detecting the operative amount of the crusher is provided in the pilot lines 52*c* and 52*d* to which the pilot pressure of the control lever device 52 is outputted. Similar shuttle valves are also provided in other control lever devices.

The pilot pressures detected by the shuttle valves 60, 62 . . . associated with the control valve group 20 out of the above-mentioned shuttle valves 60, 61, 62 . . . are conducted to a high pressure selecting valve block 63 through a signal hydraulic line 71. Then, in the high pressure selecting valve block 63, the highest pressure is selected from among those pressures and the highest pressure thus selected is outputted as a positively-controlled pump command pressure PIP to the signal hydraulic line 73.

Likewise, the pilot pressures detected by the shuttle valves 26, 27 . . . associated with the control valve group 21 are conducted to a high pressure selecting valve block 64 through a signal hydraulic line 72. In the high pressure selecting valve block 64, the highest pressure is selected from among those pressures, and the highest pressure thus selected is outputted as a positively-controlled pump command pressure P2P to a signal hydraulic line 74.

A tilt control mechanism 13 inputs the positive control command pressure PIP from a signal hydraulic line 75 and controls the tilting angle (displacement volume) of the hydraulic pump 11 in such a manner that the tilting angle in question increases with a rise of the command pressure. Moreover, the tilt control mechanism 13 inputs the delivery pressure of the hydraulic pump 11 associated with itself from a signal hydraulic line 76 and further inputs the delivery pressure of the other hydraulic pump 12 from a signal hydraulic line 77. When an average delivery pressure of the hydraulic pumps 11 and 12 exceeds a preset value, the tilt control mechanism 13 decreases the tilting angle of the hydraulic pump 11 with a rise of the average delivery pressure and controls the tilting angle of the hydraulic pump 11 so as to keep the absorption torques of the hydraulic pumps 11 and 12 constant.

Likewise, the tilt control mechanism 14 inputs the positive control command pressure P2P from a signal hydraulic line 78 and controls the tilting angle (displacement volume) of the hydraulic pump 12 in such a manner that the tilting angle in question increases with a rise of the command pressure. Moreover, the tilt control mechanism 14 inputs the delivery pressure of the hydraulic pump 12 associated with itself from a signal hydraulic line 79 and further inputs the delivery pressure of the other hydraulic pump 11 from a signal hydraulic line 80. When an average delivery pressure of the hydraulic pumps 11 and 12 exceeds a preset value, the tilt control mechanism 14 decreases the tilting angle of the hydraulic pump 12 with a rise of the average delivery pressure and controls the tilting angle of the hydraulic pump 12 so as to keep the absorption torques of the hydraulic pumps 11 and 12 constant.

The hydraulic oil (hydraulic working fluid) discharged from the hydraulic pumps 11 and 12 and then passing through the control valve groups 20 and 21 is returned to a hydraulic oil tank 42 from a discharge line 43 directly or as return oil from hydraulic actuators such as the hydraulic motor 32 and a boom cylinder 218. In the discharge line 43 is disposed an oil cooler 40 for cooling the hydraulic oil which is returned to the hydraulic oil tank 42. The oil cooler 40 is cooled by a cooling fan 41. The cooling fan 41 is rotated by the engine 10 together with the hydraulic pumps 11 and 12.

The working fluid cooling control system of this embodiment is provided in the hydraulic drive system constructed as above. This system includes a traveling motor speed pickup 101, a pressure sensor 102, a signal receiving line 103*a* of the option selecting switch 103, and a temperature sensor 104. The traveling motor speed pickup 101, the pressure sensor 102 and the signal receiving line 103*a* of the option selecting switch 103 are provided as means for detecting operation patterns in which the temperature of the working fluid in the circuit increases. The traveling motor speed pickup 101 detects the number of revolutions of the hydraulic motor 32 and thereby detects the vehicle speed. The pressure sensor 102 detects a pilot pressure of the signal hydraulic line 72 and thereby detects the amount of operation (amount of depression) of the traveling pedal 51*a*. The signal receiving line 103*a* of the option selecting switch 103 receives a mode switching signal of the option selecting switch 103 and thereby detects an operation pattern in which an attachment (e.g., crusher) which requires a high flow rate and a large horsepower is used. The temperature sensor 104 is provided in the hydraulic oil tank 42 to detect the temperature of the working fluid (oil temperature) in the circuit.

The working fluid cooling control system of this embodiment further includes a controller 100, proportional solenoid valves 105 and 106 and shuttle valves 109 and 110. The controller 100 inputs detection signals from the traveling motor speed pickup 101, the pressure sensor 102, the signal receiving line 103*a* of the option selecting switch 103 and the temperature sensor 104, then performs predetermined processing and outputs control currents I1*c* and I2*c* (control signals) to solenoids 105*a* and 106*a* of the proportional solenoid valves 105 and 106. The proportional solenoid valves 105 and 106 output control pressures P1C and P2C corresponding to the control signals to signal hydraulic lines 107 and 108. A shuttle valve 109 is disposed between the signal hydraulic line 73 on the output side of the high pressure selecting valve block 63 and the signal hydraulic line 107 and selects either the positively-controlled pump command pressure PIP selected by the high pressure selecting valve block 63 or the control pressure P1C outputted from the proportional solenoid valve 105 whichever is at a higher level, and then outputs the thus-selected pressure to the signal hydraulic line 75 in the tilt control mechanism 13.

Likewise, the shuttle valve 110 is disposed between the signal hydraulic line 74 on the output side of the high pressure selecting valve block 64 and the signal hydraulic line 108. The shuttle valve 110 selects either the positive control command pressure P2P selected by the high pressure selecting valve block 64 or the control pressure P2C outputted from the proportional solenoid valve 106 whichever is at a higher level and then outputs the thus-selected pressure to the signal hydraulic line 78 in the tilt control mechanism 14.

Figure 2:
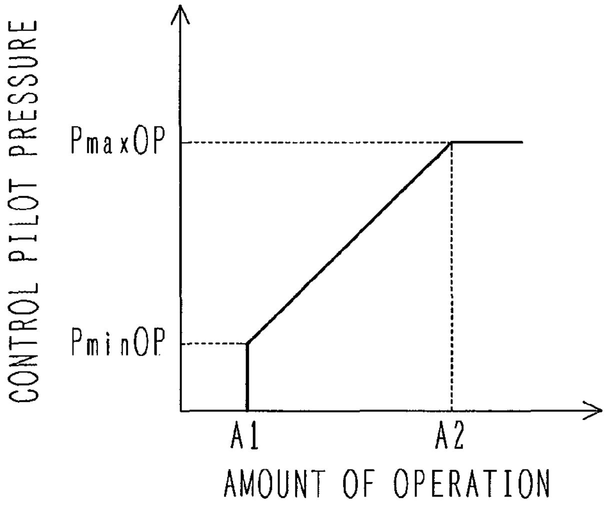
FIG. 2 illustrates the relation between the amounts of operation of a control lever or a pedal in operation means such as a control lever device, a traveling pedal device or a control lever device for a crusher and output pilot pressures (control pilot pressures).

FIG. 2 is a graph illustrating the relation between the amount of operation of the control lever or pedal in operation means such as the control lever device 50, the traveling pedal device 51, or the control lever device 52 for a crusher and the output pilot pressure (control pilot pressure).

In FIG. 2, the control pilot pressure (tank pressure) is zero while the amount of operation is in a dead zone A1. When the amount of operation exceeds A1, the output pilot pressure increases from a minimum pilot pressure PminOP to a maximum pilot pressure PmaxOP until the amount of operation reaches A2. When the amount of operation exceeds A2, the control pilot pressure becomes constant at the maximum pressure PmaxOP.

Figure 3:
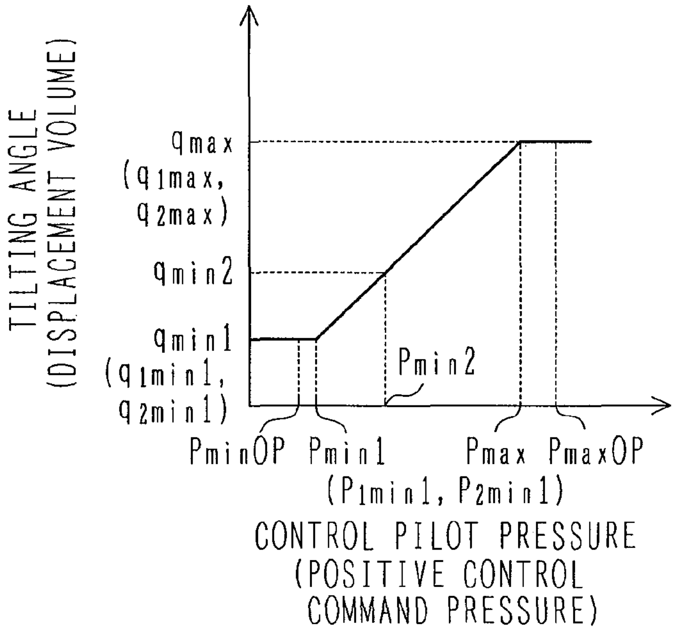
FIG. 3 illustrates a positive control function of a tilt control mechanism.

FIG. 3 is a graph illustrating a positive control function of the tilt control mechanisms 13 and 14, in which pressures inputted to the tilt control mechanisms 13 and 14 are plotted along the horizontal axis and tilting angles of the hydraulic pumps 11 and 12 controlled by the tilt control mechanisms 13 and 14 are plotted along the vertical axis.

In FIG. 3, until the input pressure reaches Pmin1 (P1min1, P2min1), the tilting angles of each of the hydraulic pumps 11 and 12 are constant at qmin1 (q1min1, q2min1). When the input pressure exceeds Pmin1, an increase in tilting angle occurs from a minimum tilting angle qmin1 to a maximum tilting angle qmax (q1max, q2max) until the input pressure reaches Pmax. When the input pressure exceeds Pmax, the tilting angle becomes constant at the maximum value qmax.

The minimum tilting angle qmin1 is set for the purpose of ensuring self-lubricating properties of the hydraulic pumps 11 and 12, while the maximum tilting angle qmax is determined by the specifications of the hydraulic pumps 11 and 12.

Figure 4:
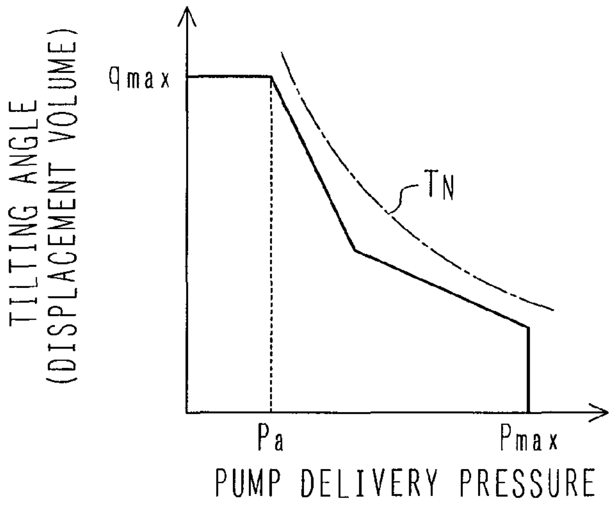
FIG. 4 illustrates an absorption torque limiting control function of the tilt control mechanism.

FIG. 4 is a graph illustrating an absorption torque limiting control function of the tilt control mechanisms 13 and 14, in which average values of delivery pressure of the hydraulic pumps 11 and 12 are plotted along the horizontal axis and maximum tilting angles (maximum displacement volume) of each of the hydraulic pumps 11 and 12 are plotted along the vertical axis. The maximum tilting angle means a limiting value for a tilting angle.

In FIG. 4, the maximum tilting angles of each of the hydraulic pumps 11 and 12 are maximum at qmax (q1max, q2max) until the average value of delivery pressure of the hydraulic pumps 11 and 12 reaches Pa. When the average value of delivery pressure of the hydraulic pumps 11 and 12 exceeds Pa, the tilting angles of each of the hydraulic pumps 11 and 12 decrease with a rise in delivery pressure of both pumps. Pmax is a relief pressure of a main relief valve (not shown) connected to delivery hydraulic lines of the hydraulic pumps 11 and 12.

When a target tilting angle based on the positive control function shown in FIG. 3 is smaller than the maximum tilting angle based on the absorption torque limiting control function shown in FIG. 4 and corresponding to an average pump pressure value obtained at the time of the detection, the tilt control mechanisms 13 and 14 control the tilting angles of the hydraulic pumps 11 and 12 in such a manner that the tilting angles of the hydraulic pumps 11 and 12 become equal to the tilting angle based on the positive control function. When the tilting angle based on the positive control function exceeds the maximum tilting angle based on the absorption torque limiting control function, the tilt control mechanisms 13 and 14 control the tilting angles of the hydraulic pumps 11 and 12 in such a manner that the tilting angles are limited to that maximum tilting angle. As a result, the total absorption torque of the hydraulic pumps 11 and 12 is controlled so as not to exceed a torque curve Tn shown in FIG. 4. The torque curve Tn in FIG. 4 indicates a maximum output torque and thereabouts in a regulation area of the engine 10. Consequently, it is possible to prevent engine stall caused by overloading of the engine 10.

If the vertical axis in FIG. 4 is replaced with pump flow rate, the illustrated control becomes horsepower control and Tn becomes a horsepower curve. The control using the horizontal axis in FIG. 4 as average values of delivery pressures of the hydraulic pumps 11 and 12 is called full horsepower control.

Figure 5:
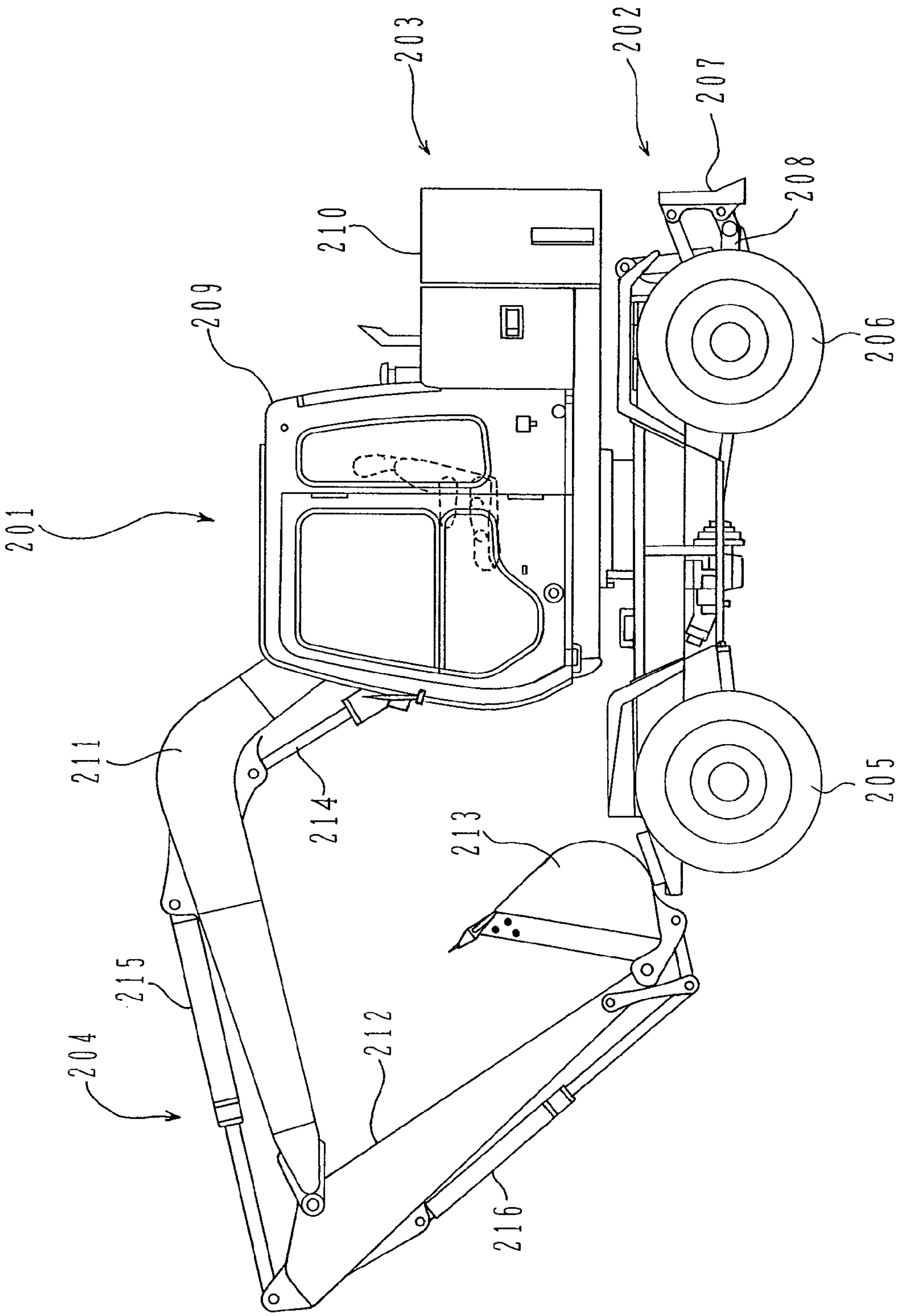
FIG. 5 is a side view of a wheel excavator which carries thereon the hydraulic drive system associated with the embodiment.

FIG. 5 is a side view of a wheel excavator which carries thereon the hydraulic drive system associated with this embodiment.

In FIG. 5, the wheel excavator 201 includes a lower travel structure 202, an upper swing structure 203 mounted rotatably on the lower travel structure 202, and a front working device 204. The lower travel structure 202 includes front wheels 205 and rear wheels 206, the rear wheels 206 being driven by the hydraulic motor 32 shown in FIG. 1.

The upper swing structure 203 includes a so-called cabin-type cab 209 and an outer cover 210 which covers the greater part of the upper swinging structure 203 other than the cab 209. The engine 10 and the hydraulic pumps 21 and 22 which are shown in FIG. 1 are mounted inside the outer cover 210.

The front working device 204 includes a boom 211, an arm 212 connected to the boom 211 pivotably, and a bucket 213 connected to the arm 212 pivotably. The boom 211, arm 212 and bucket 213 are actuated by a boom cylinder 214, arm cylinder 215 and bucket cylinder 216, respectively.

Figure 6:
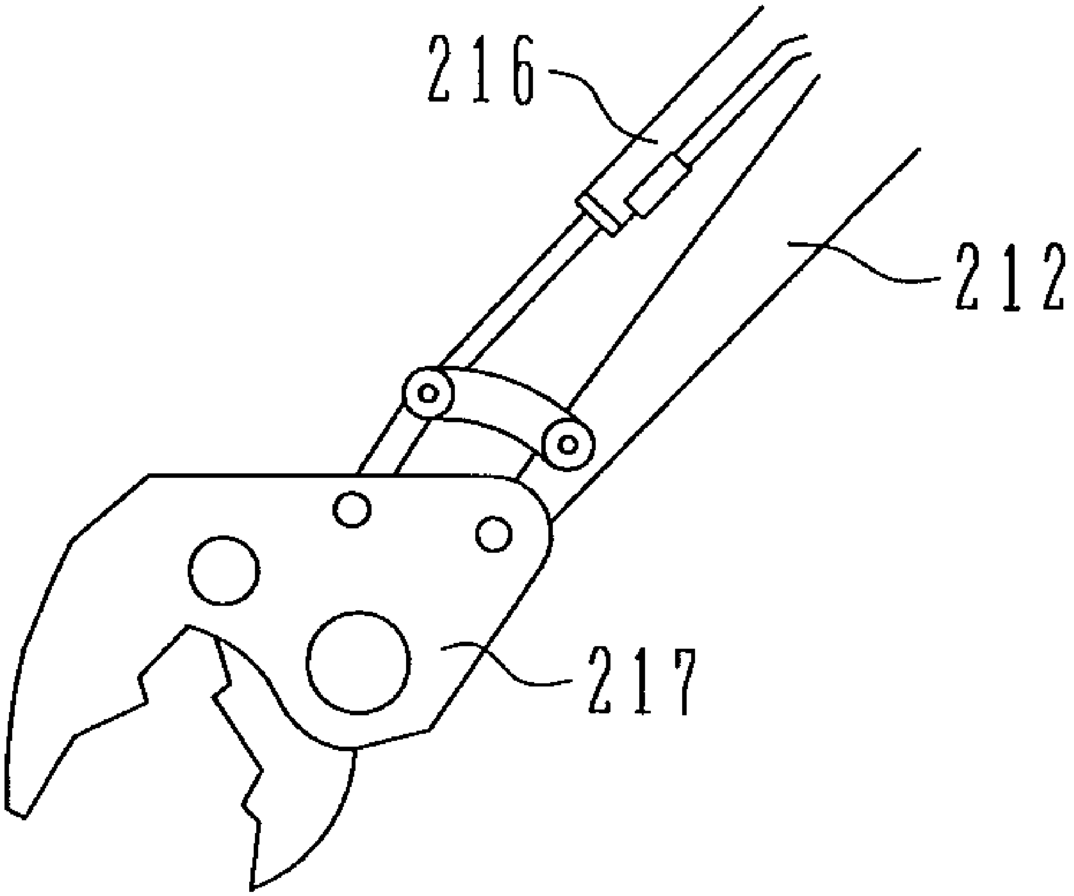
FIG. 6 illustrates a part of a front working device equipped with a crusher instead of a bucket as an working device attachment.

FIG. 6 illustrates a part of the front working device 204 which is equipped with a crusher 217 instead of the bucket 213 as an working device attachment.

The crusher 217, one of the working device attachments, is attached to a front end of the working device in place of the bucket 213, and it contains the actuator 218 shown in FIG. 1. In comparison with the bucket cylinder 216, the actuator 218 shown in FIG. 1 requires a high flow rate (e.g., a flow rate corresponding to two pumps) and a high horsepower.

Figure 7:
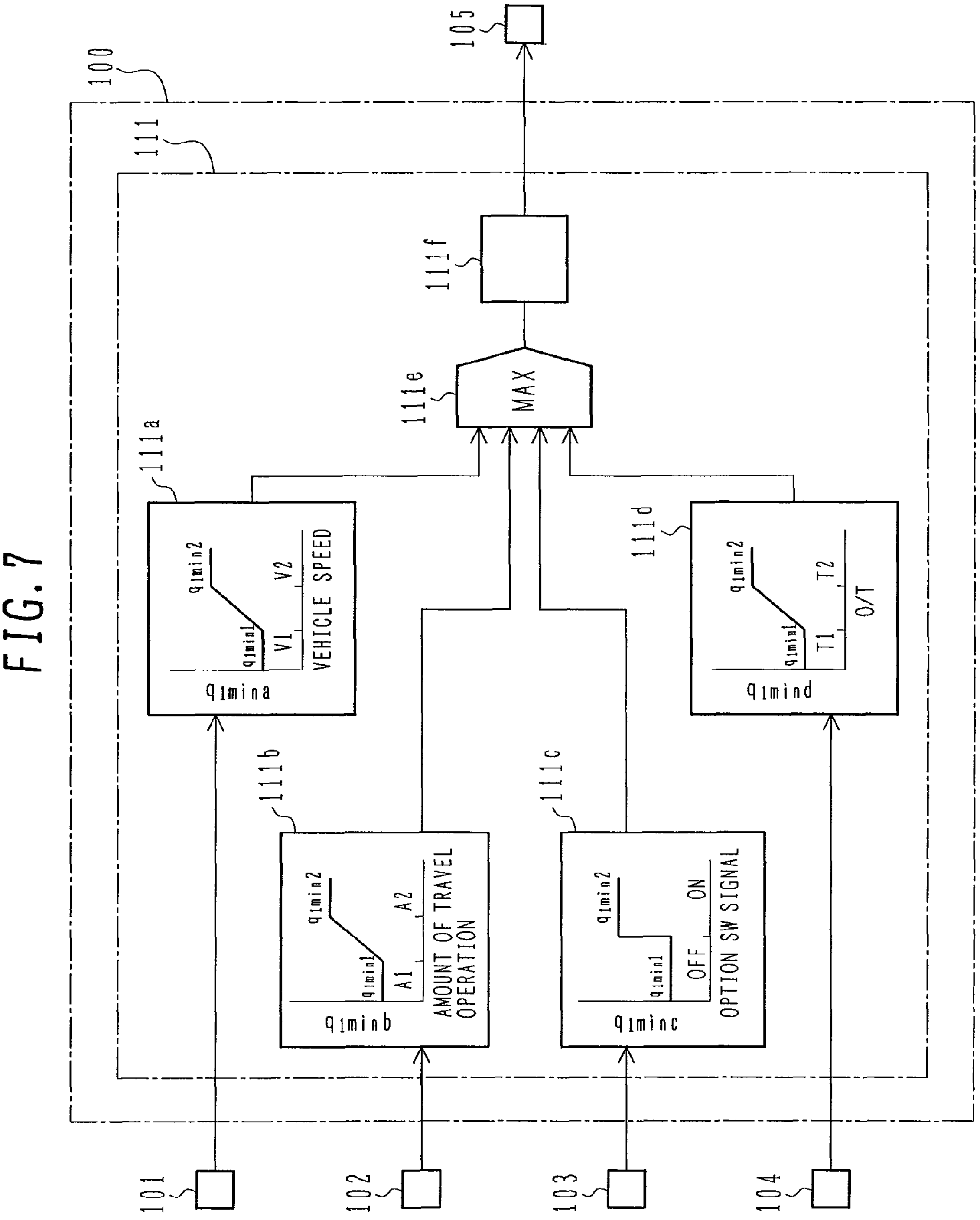
FIG. 7 is a functional block diagram showing the details of arithmetic processing performed by a first minimum pump tilt calculating section of a controller.
Figure 8:
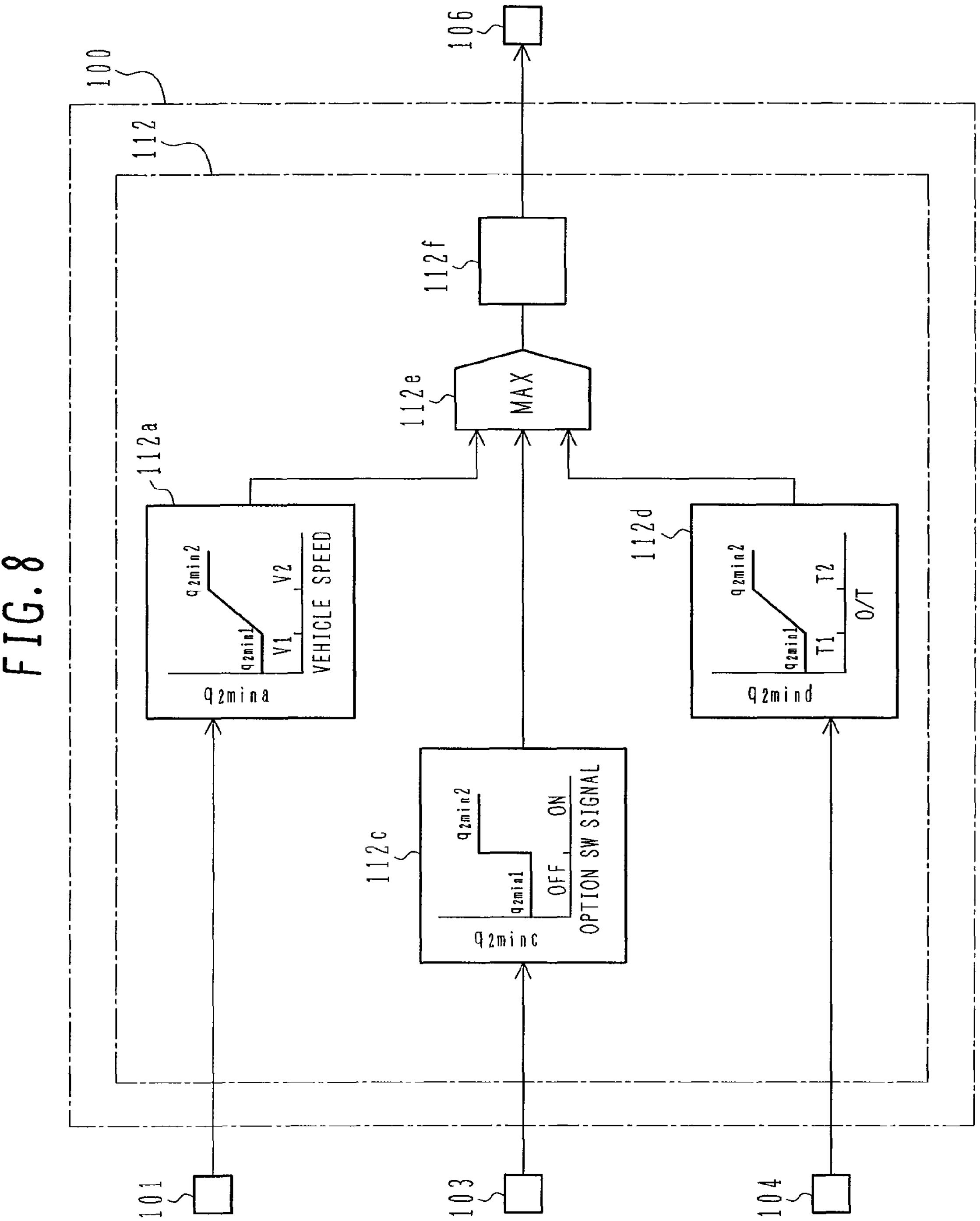
FIG. 8 is a functional block diagram showing the details of arithmetic processing performed by a second minimum pump tilt calculating section of the controller.

FIGS. 7 and 8 are functional block diagrams showing the details of arithmetic processing performed by the controller 100.

The controller 100 includes, as shown in FIG. 7, a first minimum pump tilt calculating section 111 which inputs detection signals from the traveling motor speed pickup 101, pressure sensor 102, signal receiving line 103*a* of the option selecting switch 103 and temperature sensor 104 and outputs a control signal for increasing the minimum tilting angle of the hydraulic pump 11 to the proportional solenoid valve 105; it also includes, as shown in FIG. 8, a second minimum pump tilt calculating section 112 which inputs detection signals from the traveling motor speed pickup 101, signal receiving line 103*a* of the option selecting switch 103, and temperature sensor 104 and outputs a control signal for increasing the minimum tilting angle of the hydraulic pump 12 to the proportional solenoid valve 106.

In FIG. 7, the first minimum pump tilt calculating section 111 includes a minimum tilt calculator 111*a* which utilizes vehicle speeds, a minimum tilt calculator 111*b* which utilizes the amounts of travel operation, a minimum tilt calculator 111*c* which utilizes mode switching signals, a minimum tilt calculator 111*d* which utilizes oil temperatures, a maximum value selector 111*e*, and a control signal generator 111*f*.

The minimum tilt calculator 111*a* utilizing vehicle speed inputs the number of revolutions of the hydraulic motor 32 from the traveling motor speed pickup 101 as vehicle speed information, then refers to a table stored in memory beforehand for that information, and calculates a minimum tilting angle q1mina of the hydraulic pump 11 corresponding to the vehicle speed detected at that moment. As shown in FIG. 7, the relation between vehicle speeds and the minimum tilting angles q1mina is set in the table stored in memory in such a manner that, during the period up to V1 indicating low vehicle speeds, the minimum tilting angle q1mina takes the same constant value as the minimum tilting angle q1min1 shown in FIG. 3, which is set in the tilt control mechanism 13, while with an increase of the vehicle speed from V1 to V2, the minimum tilting angle q1mina increases from q1min1 to q1min2, and when the vehicle speed becomes as high as V2 or more, the minimum tilting angle q1mina becomes constant at q1min2.

The minimum tilt calculator 111*b* utilizing the amounts of travel operation inputs from the pressure sensor 102 a pilot pressure of the signal hydraulic line 72 as information on the amount of operation (amount of depression) of the traveling pedal 51*a*, then refers to a table stored in memory beforehand for that information, and calculates a minimum tilting angle q1minb of the hydraulic pump 11 corresponding to the amount of operation of the pedal detected at that moment. In the table stored in memory, as shown in FIG. 7, the relation between the amounts of operation of the pedal and the minimum tilting angles q1minb is set in such a manner that, during the period up to A1 indicating small amounts of pedal operation, the minimum tilting angle q1minb takes the same constant value as the minimum tilting angle q1min1 set in the tilt control mechanism 13 and shown in FIG. 3, while as the amount of pedal operation increases from A1 to A2, the minimum tilting angle q1minb increases from q1min1 to q1min2, and when the amount of pedal operation becomes greater than A2, the minimum tilting angle q1minb becomes constant at q1min2.

The minimum tilt calculator 111*c* utilizing mode switching signals inputs a mode switching signal (option switching signal) from the signal receiving line 103*a* of the option selecting switch 103, then refers to a table stored in memory beforehand for that signal, and calculates a minimum tilting angle q1minc of the hydraulic pump 11 corresponding to the mode switching signal information. In the table stored in memory, as shown in FIG. 7, the relation between the mode switching signals and the minimum tilting angles q1minc is set in such a manner that when the signal of the option selecting switch 103 is OFF, the minimum tilting angle q1minc takes the same value as the minimum tilting angle q1min1 set in the tilt control mechanism 13 and shown in FIG. 3, while the minimum tilting angle q1minc becomes q1min2 with the signal of the option selecting switch 103 being ON.

The minimum tilt calculator 111*d* utilizing oil temperature inputs oil temperature information of the hydraulic oil tank 42 from the temperature sensor 104, then refers to a table stored in memory in advance for that information, and calculates a minimum tilting angle q1mind of the hydraulic pump 11 corresponding to the oil temperature detected at that moment. In the table stored in memory, as shown in FIG. 7, the relation between oil temperatures and the minimum tilting angles q1mind is set in such a manner that: while the oil temperature stays below T1, an upper limit of a normal temperature range, the minimum tilting angle q1mind takes the same constant value as the minimum tilting angle q1min1 set in the tilt control mechanism 13 and shown in FIG. 3; that the minimum tilting angle q1mind increases from q1min1 to q1min2 as the oil temperature increases from T1 to T2; and that the minimum tilting angle q1mind becomes constant at q1min2 when the oil temperature becomes greater than T2.

The maximum value selector 111*e* inputs the minimum tilting angles q1mina, q1minb, q1minc, and q1mind of the hydraulic pump 11 calculated respectively in the minimum tilt calculator 111*a* utilizing vehicle speeds, in the minimum tilt calculator 111*b* utilizing the amounts of travel operation, in the minimum tilt calculator 111*c* utilizing mode switching signals and in the minimum tilt calculator 111*d* utilizing oil temperatures, then selects q1minx as a maximum value of those tilting angles and outputs it to the control signal generator 111*f*.

Figure 9:
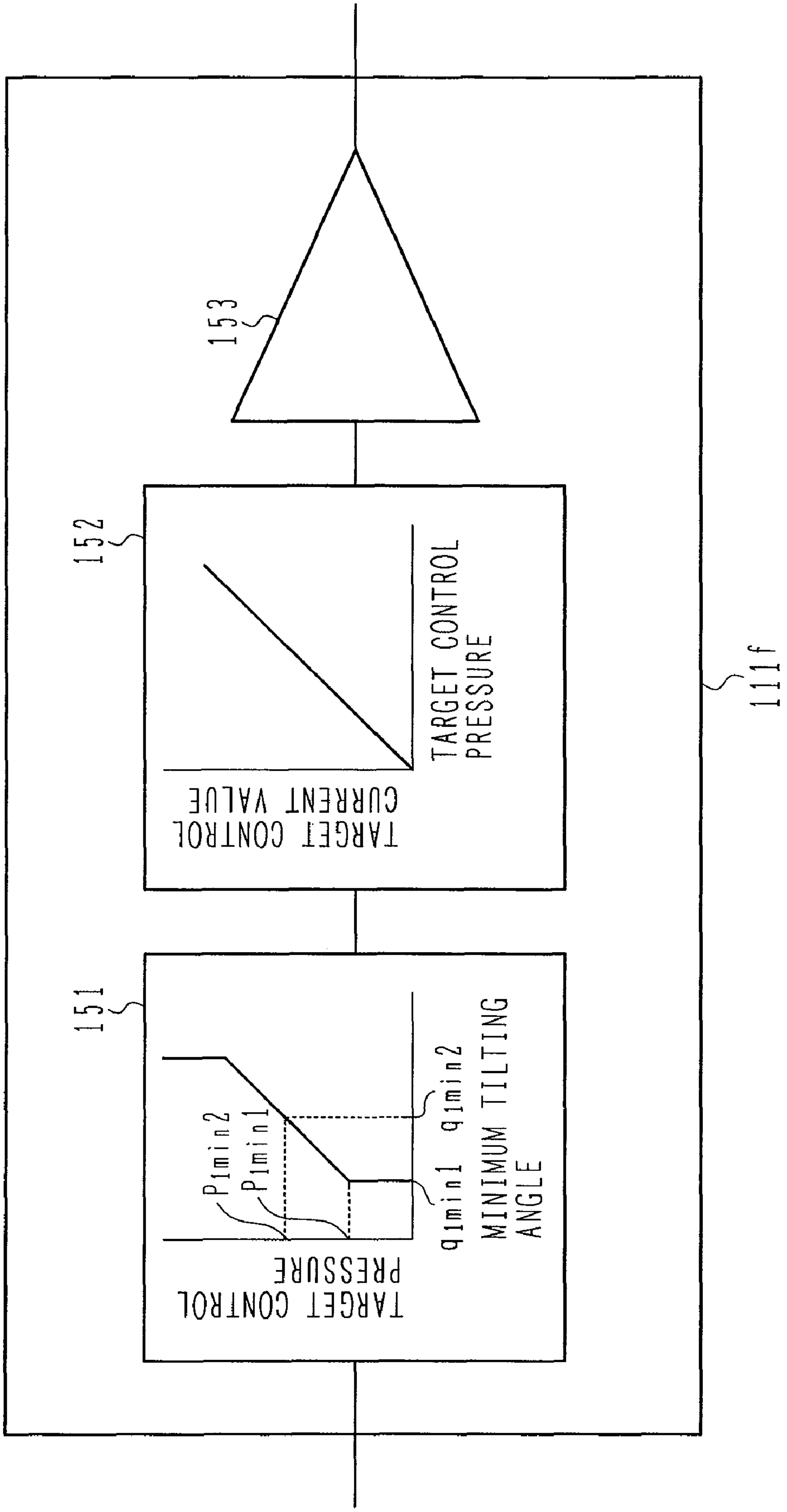
FIG. 9 is a functional block diagram showing the details of arithmetic processing performed by a control signal generator in the first minimum pump tilt calculating section.

FIG. 9 is a functional block diagram showing the details of arithmetic processing performed by the control signal generator 111*f*. The control signal generator 111*f* includes a control pressure calculator 151, a control current calculator 152 and an amplifier 153. The control pressure calculator 151 inputs a maximum value q1minx, then refers to a table stored in memory beforehand for that information, and calculates a corresponding target control pressure P1CO. Such a relation between the maximum value q1minx and the target control pressure P1CO as shown in FIG. 9 is set in the table stored in memory. This relation is an inverse function of the relation between control pilot pressures and tilting angles of the hydraulic pumps 11 and 12 to be controlled, as shown in FIG. 3.

The control current calculator 152 inputs the target control pressure P1CO, then refers to a table stored in memory beforehand for that information, and calculates a target control current I1CO corresponding to the target control pressure P1CO input at that moment. In the table stored in memory, the relation between the target control pressures P1CO and the target control currents I1CO is set in such a manner that the target control current I1CO increases as the target control pressure P1CO increases.

The amplifier 153 amplifies the target control current I1CO into a control current I1C and outputs this amplified current to the solenoid 105*a* of the proportional solenoid valve 105.

The proportional solenoid valve 105 operates with the control current I1C inputted to the solenoid 105*a* and outputs a corresponding control pressure P1C. The control pressure P1C corresponds to the target control pressure P1CO calculated by the control pressure calculator 151 at the time of the control pressure outputting.

In FIG. 8, the second minimum pump tilt calculating section 112 includes a minimum tilt calculator 112*a* which utilizes vehicle speeds, a minimum tilt calculator 112*c* which utilizes mode switching signals, a minimum tilt calculator 112*d* which utilizes oil temperatures, a maximum value selector 112*e*, and a control signal generator 112*f*.

The minimum tilt calculator 112*a* utilizing vehicle speeds inputs the number of revolutions of the hydraulic motor 32 from the traveling motor speed pickup 101 as vehicle speed information, then refers to a table stored in memory beforehand for that information, and calculates a minimum tilting angle q2mina of the hydraulic pump 12 corresponding to vehicle speed information input at that moment. In the table stored in memory, as shown in FIG. 8, the relation between vehicle speeds and the minimum tilting angles q2mina is set in such a manner that: during the period up to V1 of low vehicle speeds, the minimum tilting angle q2mina takes the same constant value as the minimum tilting angle q2min1 set in the tilt control mechanism 14 and shown in FIG. 3; that it increases from q2min1 to q2min2 as the vehicle speed increases from V1 to V2; and that it becomes constant at q2min2 when the vehicle speed becomes greater than V2.

The minimum tilting angle calculator 112*c* utilizing mode switching signals inputs a mode switching signal (option switching signal) from the signal receiving line 103*a* of the option selecting switch 103, then refers to a table stored in memory beforehand for that signal, and calculates a minimum tilting angle q2minc of the hydraulic pump 12 corresponding to information on the mode switching signal. In the table stored in memory, as shown in FIG. 8, the relation between the mode switching signals and the minimum tilting angles q2minc is set in such a manner that when the option selecting switch 103 is OFF, the minimum tilting angle q2minc takes the same value as the minimum tilting angle q2min1 set in the tilt control mechanism 14 and shown in FIG. 3 while the minimum tilting angle q2minc becomes q2min2 with the option selecting switch 103 being ON.

The minimum tilting angle calculator 112*d* utilizing oil temperatures inputs oil temperature information of the hydraulic oil tank 42 from the temperature sensor 104, then refers to a table stored in memory beforehand for that information, and calculates a minimum tilting angle q2mind of the hydraulic pump 11 corresponding to the oil temperature information input at that moment. In the table stored in memory, as shown in FIG. 8, the relation between oil temperatures and the minimum tilting angles q1mind is set in such a manner that: during the period up to T1 of the lowest oil temperature, the minimum tilting angle q2mind takes the same constant value as the minimum tilting angle q2min1 set in the tilt control mechanism 14 and shown in FIG. 3; that it increases from q2min1 to q2min2 as the oil temperature increases from T1 to T2; and that it becomes constant at q2min2 when the oil temperature becomes greater than T2.

The maximum value selector 112*e* inputs the minimum tilting angles q2mina, q2minc, and q2mind of the hydraulic pump 12 calculated respectively by the minimum tilt calculator 112*a* utilizing vehicle speeds, the minimum tilt calculator 112*c* utilizing mode switching signals and the minimum tilt calculator 112*d* utilizing oil temperatures, then selects the maximum value out of those values as q2miny and outputs it to the control signal generator 112*f.*

Figure 10:
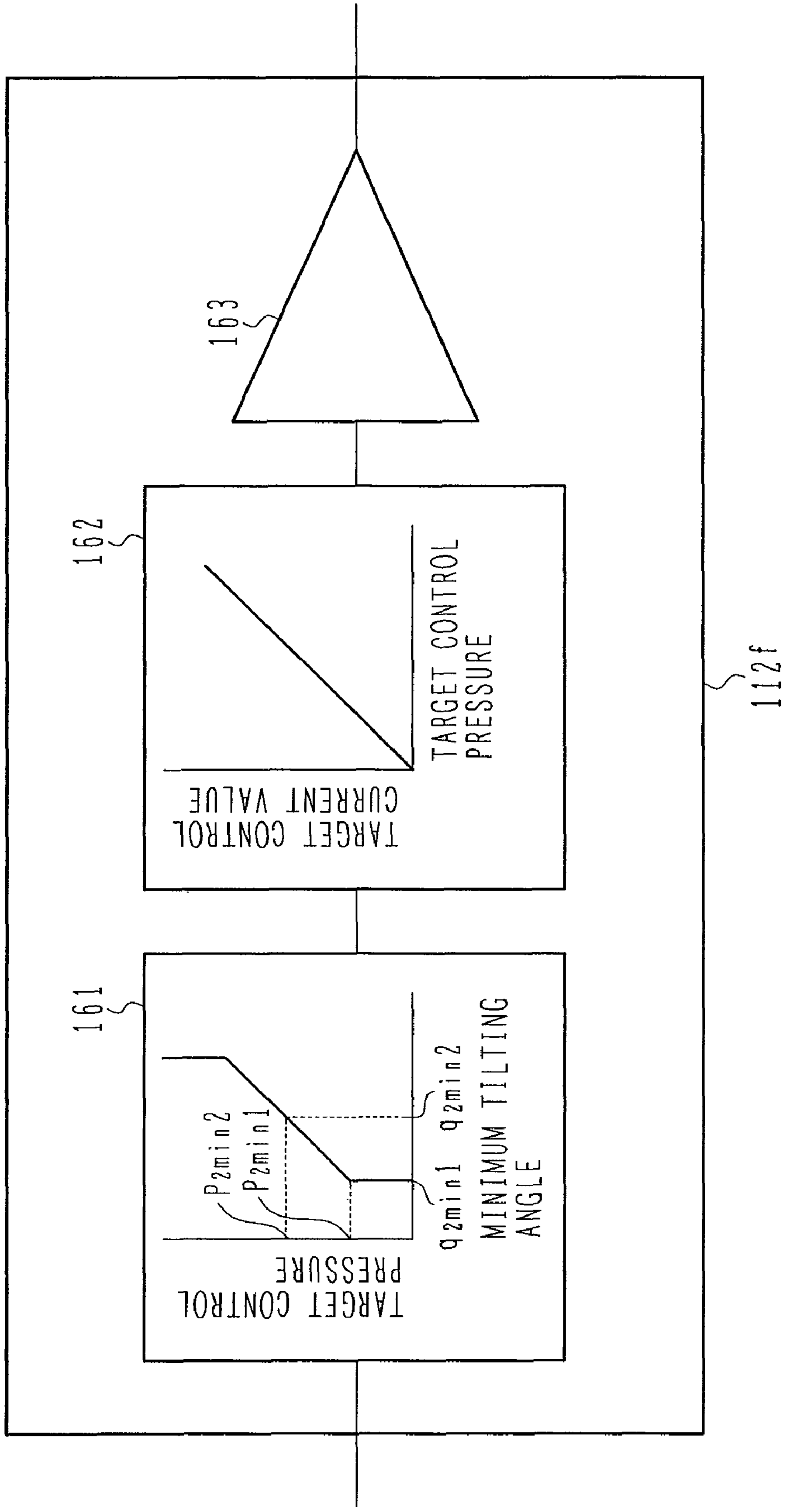
FIG. 10 is a functional block diagram showing the details of arithmetic processing performed by a control signal generator in the second minimum pump tilt calculating section.

FIG. 10 is a functional block diagram showing the details of arithmetic processing performed by the control signal generator 112*f*. The control signal generator 112*f* includes a control pressure calculator 161, a control current calculator 162, and an amplifier 163. The control pressure calculator 161 inputs a maximum value q2miny, then refers to a table stored in memory beforehand for that ionformation, and calculates a corresponding target control pressure P2CO. Such a relation between the maximum values q2miny and target control pressures P2CO as shown in FIG. 10 is set in the table stored in memory. This relation is an inverse function of the relation between control pilot pressures and tilting angles of each of the hydraulic pumps 11 and 12 to be controlled, as shown in FIG. 3.

The control current calculator 162 inputs the target control pressure P2CO, then refers to a table stored in memory beforehand for that information, and calculates a target control current I2CO corresponding to the target control pressure P2CO input at that moment. The relation between the target control pressures P2CO and the target control currents I2CO is set in the table stored in memory in such a manner that the target control current I2CO increases as the target control pressure P2CO increases.

The amplifier 163 amplifies the target control current I2CO into a control current I2C and outputs the control current I2C to the solenoid 106*a* of the proportional solenoid valve 106.

The proportional solenoid valve 106 operates with the control current I2C inputted to the solenoid 106*a* and outputs a corresponding control pressure P2C. The control pressure P2C corresponds to the target control pressure P2CO calculated by the control pressure calculator 161 at the time of the control pressure outputting.

In the above construction, the traveling motor speed pickup 101, the pressure sensor 102 and the signal receiving line 103*a* of the option selecting switch 103 constitute first detection means for detecting an operation pattern corresponding to a rise in temperature of the working fluid out of the operation patterns related to the plural members to be operated 32, 214, 218, . . . . The controller 100, the proportional solenoid valves 105 and 106, the shuttle valves 109 and 110 and the tilt control mechanisms 13 and 14 constitute pump flow rate increasing means for increasing the minimum capacities of the hydraulic pumps 11 and 12 on the basis of the operation pattern detected by the first detection means and thereby increasing an average flow rate of the working fluid passing through the oil cooler (heat exchanger) 40.

Further, the controller 100, the proportional solenoid valves 105 and 106, the shuttle valves 109 and 110, and the tilt control mechanisms 13 and 14 constitute pump flow rate increasing means for increasing the minimum capacity of at least one of the plural hydraulic pumps 11 and 12 (either the hydraulic pump 11 or 12) on the basis of the operation pattern detected by the first detection means and thereby increasing an average flow rate of the working fluid passing through the oil cooler (heat exchanger) 40.

The traveling motor speed pickup 101 as the first detection means is for detecting, as an operation pattern corresponding to a rise in temperature of the working fluid, an operation pattern related to the first member to be operated (traveling motor 32) which is actuated by the hydraulic pump 12, one of the plural hydraulic motors 11 and 12. In this case, the pump flow rate increasing means described above is configured so as to increase not only the minimum capacity of the hydraulic pump 12, one of the above-mentioned hydraulic pumps, but also the minimum capacity of the hydraulic pump 11, the other of the above-mentioned hydraulic pumps, based on the operation pattern related to the first member to be operated (traveling motor 32); it may also be configured so as to increase only the minimum capacity of the hydraulic pump 11, the other of the foregoing hydraulic pumps.

The following description is now provided about the operation of this embodiment.

First, a description will be given about a normal operating performed in a state in which the front working device 204 is equipped with the bucket 213.

When all of the operation means, including the control lever device 50 and the traveling pedal device 51, are in an unoperated state during the normal operation, the pilot pressure outputted from the operation means is zero (tank pressure), and the pressures of each of the signal hydraulic lines 73 and 74 are also zero (tank pressure).

On the other hand, the option selecting switch 103 is OFF (normal operation mode) in the normal operation, that is, it is in an unoperated state, so that the values of detection signals from each of the traveling motor speed pickup 101 and the pressure sensor 102 are also zero. Further, when the oil temperature in the hydraulic oil tank 42 is within its normal range, the detection signal from the temperature sensor 104 also takes a value proportional thereto. In this case, q1min1 and q2min1 are thus calculated as minimum tilting angles in the first and second minimum pump tilt calculating sections 111 and 112 of the controller 100, and corresponding control currents I1C and I2C are outputted to the proportional solenoid valves 105 and 106, which in turn output control pressures P1C and P2C corresponding to q1min1 and q2min1, respectively. The control pressures P1C and P2C correspond to the target control pressures P1min1 and P2min2, respectively, which are calculated in the control pressure calculators 151 and 161 shown in FIGS. 9 and 10. As a result, control pressures P1C and P2C are selected in the shuttle valves 109 and 110. The control pressures P1C and P2C thus selected are inputted to the tilt control mechanisms 13 and 14, whereby the tilting angles of the hydraulic pumps 11 and 12 are controlled so as to become q1min1 and q2min1, respectively. The control result obtained is the same as that obtained in the case where the pressures (zero) in the signal hydraulic lines 73 and 74 are inputted as pump command pressures to the tilt control mechanisms 13 and 14 (prior art).

In this state, when, for example, the operator operates the control lever 50*a* of the control lever device 50 with the intention of moving the boom 211, a control pilot pressure is generated in either the pilot line 50*c* or 50*d*, and the control valve 22 is switched over by that pilot pressure. At the same time, that pressure is detected by the shuttle valve 60 and is further selected by the high pressure selecting valve block 63, then is outputted as the pump command pressure PIP to the signal hydraulic line 73.

On the other hand, the value of a signal from the signal receiving line 103*a* of the option selecting switch 103 as well as the values of detection signals from the traveling motor speed pickup 101, pressure sensor 102 and temperature sensor 104, which are inputted to the controller 100 at this moment, are the same as the values in the unoperated state mentioned above, and pressures (<P1P) corresponding to the target control pressures P1min1 and P2min1 are outputted to the signal hydraulic lines 107 and 108. As a result, the pump command pressure PIP is selected in the shuttle valve 109. In the tilt control mechanism 13, the tilt of the hydraulic pump 11 is controlled by the above-mentioned positive flow rate control (FIG. 3) and the absorption torque limiting control (FIG. 4) on the basis of the pump command pressure PIP and an average delivery pressure value of the hydraulic pumps 11 and 12.

The operations performed in the above normal operation are also true of the case where other operation means associated with the control valve group 20 is operated and of the case where operation means associated with the control valve group 21 other than the traveling pedal device 51 is operated.

The following description is now provided about operations which are performed during travel by operating the traveling pedal 51*a* of the traveling pedal device 51.

In low-speed traveling (vehicle speed <V1) involving a small amount of operation of the traveling pedal 51*a* and a low vehicle speed, q1min1 and q2min1 are calculated as minimum tilting angles in the first and second minimum pump tilt calculating sections 111 and 112 of the controller 100, and this is thus the same as in the above normal operation. That is, in the tilt control mechanism 14, the tilt of the hydraulic pump 12 is controlled by the foregoing positive flow rate control (FIG. 3) and absorption torque limiting control (FIG. 4) on the basis of the pump command pressure P2P and an average delivery pressure value of the hydraulic pumps 11 and 12.

When the traveling pedal 51*a* is operated fully with the intention of high-speed running on a flat road, a high pilot pressure is outputted from the control lever device 51 to either the pilot line 51*c* or 51*d*, and the control valve 26 is switched over by that pilot pressure. At the same time, that pressure is detected by the shuttle valve 61, further selected by the high pressure selecting valve block 64, and then outputted as the pump command pressure P2P to the signal hydraulic line 74. The pump command pressure P2P is compared with the control pressure P2C in the shuttle valve 110. Since the traveling pedal 51*a* is in full operation at this time, meaning P2P>P2C because P2P>P2min2, the pump command pressure P2P is selected in the shuttle valve 110 and is inputted to the tilt control mechanism 14.

In the tilt control mechanism 14, the tilt of the hydraulic pump 12 is controlled by the foregoing positive flow rate control (FIG. 3) and the absorption torque limiting control (FIG. 4) on the basis of the pump command pressure P2P and an average delivery pressure value of the hydraulic pumps 11 and 12.

During acceleration with a high traveling load, for example, the delivery pressure of the hydraulic pump 12 becomes a pressure higher than Pa in FIG. 4. Even if a target tilt attained by positive control of the pump command pressure P2P is, for example, qmax shown in FIG. 3, the tilting angle of the hydraulic pump 12 is limited to a tilting angle smaller than qmax. Then, hydraulic fluid with a flow rate according to that tilting angle is fed from the hydraulic pump 12 to the traveling hydraulic motor 32, and the vehicle travels at a speed proportional to that flow rate.

In steady traveling after the end of the acceleration, if the delivery pressure of the hydraulic pump 12 drops to a lower level near Pa in FIG. 4, the maximum tilting angle based on the absorption torque limiting control also becomes the same qmax as the target tilt attained by positive control of the pump command pressure P2*p*. Therefore, the tilting angle of the hydraulic pump 12 is controlled so as to become qmax by positive control, and a correspondingly large flow rate of hydraulic fluid is discharged from the hydraulic pump 12. As a result, the traveling hydraulic motor 32 rotates at high speed, and the vehicle runs at high speed.

On the other hand, the value of a detection signal provided from the pressure sensor 102 out of the signals inputted at this time to the controller 100 becomes equal to or greater than A2 in FIG. 7 because the traveling pedal 51*a* is in a state of full operation. In the target tilt calculator 111*b* in the first minimum pump tilt calculating section 111, which utilizes the amount of travel operation, q1min2 is calculated as the minimum tilting angle q1minb. Then, in the maximum value selector 111*e*, the q1min2 thus calculated is selected as q1minx and is outputted to the control signal generator 111*f*. A control current I1C corresponding to q1minx (q1min2) is outputted from the control signal generator 111*f* to the proportional solenoid valve 105, which in turn outputs a corresponding control pressure P1C to the control hydraulic line 107. The control pressure P1C corresponds to P1min2 which is calculated in the control pressure calculator 151 shown in FIG. 9. At this time, the pressure in the signal hydraulic line 73 is a tank pressure.

As a result, the control pressure P1C is selected in the shuttle valve 109 and is inputted to the tilt control mechanism 13. The tilting angle of the hydraulic pump 11 is controlled so as to become q1min2 corresponding to P1min2. That is, the minimum tilting angle of the hydraulic pump 11 increases from q1min1 to q1min2. This increases an average flow rate of hydraulic fluid which is returned to the tank 42 through the discharge line 43 and also increases an average heat discharge amount in the oil cooler 40, whereby the equilibrium temperature of the working fluid can be reduced.

If the traveling pedal 51*a* is operated fully with the intention of climbing an ascending slope, then on the hydraulic pump 12 side, as is the case with high-speed traveling on a flat road, the pump command pressure P2P based on a high pilot pressure provided from the traveling pedal device 51 is selected in the shuttle valve 110 and is inputted to the tilt control mechanism 14. In the tilt control mechanism 14, the tilt of the hydraulic pump 12 is controlled by both of the foregoing positive flow rate control (FIG. 3) and absorption torque limiting control (FIG. 4) on the basis of the pump command pressure P2P and an average delivery pressure value of the hydraulic pumps 11 and 12.

At this time, the traveling load is high due to uphill traveling, and the delivery pressure of the hydraulic pump 12 is equal to or greater than Pa in FIG. 4. Therefore, even if the target tilt based on positive control of the pump command pressure P2P is, for example, qmax in FIG. 3, the tilting angle of the hydraulic pump 12 is limited to a tilting angle smaller than qmax. Hydraulic fluid with a flow rate according to that tilting angle is fed from the hydraulic pump 12 to the traveling hydraulic motor 32, so that the vehicle runs at low speed.

At this time, on the hydraulic pump 11 side, as is the case with high-speed traveling on a flat road, q1min2 is calculated as the minimum tilting angle q1minb in the target tilt calculator 111*b* in the first minimum pump tilt calculating section 111 of the controller 100, which utilizes the amount of travel operation, and a corresponding control pressure is outputted from the proportional solenoid valve 105 to the signal hydraulic line 107. As a result, the control pressure P1C is selected in the shuttle valve 109 and is inputted to the tilt control mechanism 13, whereby the tilting angle of the hydraulic pump 11 is controlled so as to become q1min2. That is, also in this case, the minimum tilting angle of the hydraulic pump 11 increases from q1min1 to q1min2. This increases an average flow rate of the hydraulic fluid which is returned to the tank 42 through the discharge line 43 and also increases an average heat discharge amount in the oil cooler 40, whereby the equilibrium temperature of the working fluid can be reduced.

If the traveling pedal 51*a* is operated lightly with the intention of traveling on a downward slope, a low pilot pressure is outputted from the traveling pedal device 51 to either the pilot line 51*c* or 51*d*, and the control valve 26 is switched over by the pilot pressure. At the same time, that pressure is detected by the shuttle valve 61 and is further selected by the high pressure selecting valve block 64, and is outputted as the pump command pressure P2P to the signal hydraulic line 74.

On the other hand, the value of a detection signal provided from the traveling motor speed pickup 101 out of the signals inputted to the controller 100 at this time may become equal to or greater than V2 in FIG. 8 due to downhill traveling. In this case, q2min2 is thus calculated as the minimum tilting angle q2mina in the target tilt calculator 112*a* in the second minimum pump tilt calculating section 112, which utilizes vehicle speed, and a control pressure P2C corresponding to that q2min2 is outputted to the signal hydraulic line 108. The control pressure P2C corresponds to P2min2 which is calculated in the control pressure calculator 161 shown in FIG. 10.

As a result, when the amount of traveling pedal operation is small such that P2P is less than P2C (P2P<P2C), the control pressure P2C is selected in the shuttle valve 110 and is inputted to the tilt control mechanism 14, whereby the tilting angle of the hydraulic pump 12 is controlled so as to become the tilting angle q2min2. That is, the tilting angle of the hydraulic pump 12 increases to q2min2 from the tilting angle positively controlled with the pump command pressure P2P. In this case, a surplus flow amount of the hydraulic fluid discharged from the hydraulic pump 12 passes through a center bypass of the control valve 26 and returns to the tank 42 via the discharge line 43.

Also on the hydraulic pump 11 side, when the vehicle speed is V2 or higher, as is the case with the hydraulic pump 12 side, q1min2 is calculated as the minimum tilting angle q1mina in the target tilt calculator 111*a* in the first minimum pump tilt calculating section 111 of the controller 100, which utilizes vehicle speed, and a corresponding control pressure P1C (equivalent to P1min2 calculated in the control pressure calculator 151 shown in FIG. 9) is outputted from the proportional solenoid valve 105 to the signal hydraulic line 107. As a result, the control pressure P1C is selected in the shuttle valve 109 and is inputted to the tilt control mechanism 13, whereby the tilting angle of the hydraulic pump 11 is controlled so as to become q1min2. That is, also on the hydraulic pump 11 side, the minimum tilting angle increases from q1min1 to q1min2.

Thus, in certain operational conditions during downhill traveling, not only the tilting angle of the hydraulic pump 11 but also that of the hydraulic pump 12 increases greater than the tilting angle specified by the pump command pressure P2P, with the result that an average flow rate of the hydraulic fluid which is returned to the tank 42 via the discharge line 43 increases not only by the hydraulic oil fed from the hydraulic pump 11 side but also by the hydraulic oil fed from the hydraulic pump 12 side, and an average heat discharge amount in the oil cooler 40 increases. Consequently, the equilibrium temperature of the working fluid can be reduced.

Although in connection with the hydraulic pump 11 a description has been given above about the case where the vehicle speed is V2 or more, also in the case where the speed is between V1 and V2, the minimum tilting angle calculated in each of the target tilt calculators 111*a* and 112*a*, which utilize the vehicle speed, increases larger than qmin1 in the range between qmin1 and qmin2. Accordingly, the effect of on an improved cooling performance as a result of the increase in tilting angles (increase in delivery flow rates) of the hydraulic pumps 11 and 12 can be obtained accordingly.

The following description is now provided about a case where the bucket 213 is replaced with the crusher 217 and a crushing operation is performed. The crushing operation performed using the crusher 217 is an operation having a higher frequency of heavy loading in comparison with the standard operations.

When the operator pushes the option selecting switch 103 with the intention of performing crushing work such as, for example, a demolition operation, the mode switching signal turns from OFF to ON, and an ON signal is inputted to the controller 100 from the signal receiving line 103*a*. In the minimum tilt calculators 111*c* and 112*c* in the first and second minimum pump tilt calculating sections 111 and 112 of the controller 100, which utilize the mode switching signal, q1min2 and q2min2 are calculated as minimum tilting angles q1minc and q2minc, respectively, in accordance with the ON signal, and corresponding control pressures P1C and P2C are outputted to the signal hydraulic lines 107 and 108, respectively.

As a result, in an unoperated state in which none of the operation means, including the control lever device 52 for a crusher, are in operation, such as the time of a shift from one crushing operation to another, the minimum tilting angles of each of the hydraulic pumps 11 and 12 increase from q1min1 to q1min2. This increases an average flow rate of the hydraulic fluid which is returned to the tank 42 via the discharge line 43 and also increases an average heat discharge amount in the oil cooler 40, whereby the equilibrium temperature of the working fluid can be reduced.

Next, a description will be given below about what operation is to be performed if the oil temperature in the hydraulic oil tank 42 should rise beyond the normal temperature range during the normal operation.

On occasion, the working fluid temperature in the hydraulic system circuit rises due to operation in a place of an extremely high ambient temperature or due to deterioration of the machine concerned regardless of the normal operation.

When the oil temperature rises to, say, T2 or more during the normal operation, q1min2 and q2min2 are calculated as minimum tilting angles q1mind and q2mind on the basis of a detection signal provided from the temperature sensor 104 of the hydraulic oil tank 42 in the oil-temperature-based target tilt calculators 111*d* and 112*d* in the first and second pump tilt calculating sections 111 and 112 of the controller 100, and corresponding control pressures P1C and P2C are outputted.

As a result, in an unoperated state in which none of the operation means are in operation, the minimum tilting angles of each of the hydraulic pumps 11 and 12 increases from q1min1 to q1min2. This increases an average flow rate of the hydraulic fluid which is returned to the tank 42 via the discharge line 43 and also increases an average heat discharge amount in the oil cooler 40, whereby the equilibrium temperature of the working fluid can be reduced.

The following effects are obtained according to this embodiment.

(1) Signals provided from the traveling motor speed pickup 101, the pressure sensor 102, and the signal receiving line 103*a* of the option selecting switch 103 are inputted to the controller 100. During travel having a higher frequency of heavy loading in comparison with the standard operations or the crushing operation (e.g., demolition operation) using a crusher, such operation patterns are detected, and the minimum tilting angles of each of the hydraulic pumps 11 and 12 are increased. Therefore, an average flow amount of the working fluid in the oil cooler (heat exchanger) 40 can be increased beforehand, whereby the equilibrium temperature of the working fluid can be reduced and a rise in temperature of the working fluid can be prevented.

(2) A detection signal provided from the temperature sensor 104 is inputted to the controller 100. Even in the event the working fluid temperature in the hydraulic system circuit should rise due to, for example, operation in a place of a very high ambient temperature or deterioration of the machine regardless of the normal operation, such states are detected, and the minimum tilting angles of each of the hydraulic pumps 11 and 12 are increased. Therefore, an average flow amount of the working fluid in the oil cooler (heat exchanger) 40 can be increased beforehand. Consequently, the equilibrium temperature of the working fluid can be reduced and the increased temperature of the working fluid can be reduced quickly.

(3) As a result of the above (1) and (2), the frequency of the working fluid temperature rising beyond its normal range diminishes to a great extent, so that the deterioration of sealing parts due to a rise in oil temperature and the increase in wear of sliding parts due to the lowering in viscosity of the working fluid are diminished. Accordingly, reduced failures of the hydraulic devices and extended machine lives thereof can be achieved.

(4) Since the capacity of each of the hydraulic pumps 11 and 12 in an unoperated state corresponding to a neutral state of the operation means is controlled to either the minimum capacity (minimum tilting angle) qmin1 or qmin2 and is optimized, it is possible to diminish the deterioration of fuel efficiency and the increase in heat release values both attributable to the increase of pressure loss in the unoperated state. Besides, it is possible to minimize staring shocks of the members to be operated.

(5) Since the controller 100 determines whether it is necessary or not to improve the cooling performance of the oil cooler (heat exchanger) 40 and then performs control on the basis of the determination, both operator's judgment and manual operation become unnecessary. This contributes to increased ease of use (increased operability).

(6) Since, during travel, the hydraulic pump 11 (an idle hydraulic pump) not directly associated with traveling is utilized and its minimum tilting angle is increased to increase the average flow rate of the working fluid in the oil cooler (heat exchanger) 40 beforehand, it is possible to improve the cooling performance in a more effective manner and prevent a rise in temperature of the working fluid.

Although in the above embodiment the description has been given about the hydraulic drive system having two hydraulic pumps (11 and 12), only one hydraulic pump may be used. In this case, it is also possible to obtain the above effects (1) to (5).

Although in the above embodiment the traveling system is constructed so as to operate with only the hydraulic fluid fed from the hydraulic pump 12 side, it may be constructed such that the hydraulic fluid from both hydraulic pumps 11 and 12 is merged and the resultant confluent flow is fed to the traveling system to drive the same system.

Although in the above embodiment the operation mode of performing crushing work by a crusher has been described as an operation mode having a higher frequency of heavy loading, the operation mode in question may be a heavy excavation mode (power mode) in the case of a system having such operation modes as a heavy excavation mode (power mode) and a fine operation mode.

According to the construction described above, signals provided from the traveling motor speed pickup 101, the pressure sensor 102, the signal receiving line 103*a* of the option selecting switch 103 and the temperature sensor 104 are inputted to the controller 100, and the minimum tilting angles of each of the hydraulic pumps 11 and 12 are increased to improve the cooling performance in both the case (pre-case) where a rise of the working fluid temperature is predicted and the case (post-case) where the working fluid temperature rose. However, a modification may be adopted wherein the minimum tilting angles of each of the hydraulic pumps 11 and 12 are increased only in the case (pre-case) where a rise of the working fluid temperature is predicted. Also in this case, it is possible to obtain the other effects than (2) described above. As the case may be, a modification may be adopted wherein the minimum tilting angles of each of the hydraulic pumps 11 and 12 are increased only in the case (post-case) where the working fluid temperature rose. In this case, it is possible to obtain the other effects than (1) described above.

Further, although in the above embodiment the minimum capacities (minimum tilting angles) of both hydraulic pumps 11 and 12 are increased on the basis of a signal provided from the traveling motor speed pickup 101, a modification may be adopted wherein the minimum capacity (minimum tilting angle) of only the hydraulic pump 11 that is the other hydraulic pump than the one associated with traveling is increased. Also in this case it is possible to obtain the other effects than (2) described above.

In the above embodiment, the minimum tilting angles calculated in the minimum tilt calculator 111*a* utilizing the vehicle speed; in the minimum tilt calculator 111*b* utilizing the amount of travel operation; in the minimum tilt calculator 111*c* utilizing a mode switching signal; in the minimum tilt calculator 111*d* utilizing the oil temperature; in the minimum tilt calculator 112*a* utilizing the vehicle speed; in the minimum tilt calculator 112*c* utilizing a mode switching signal; and in the minimum tilt calculator 112*d* utilizing the oil temperature, with all the calculators being parts of the controller 100, are made the same values as the minimum tilting angles q1min2 and q2min2 when an operation pattern corresponding to a rise in temperature of the working fluid is detected; however, they may be made different arbitrarily according to the characteristics of various operation patterns. For example, when the vehicle speed becomes high on a descent, a rise in temperature caused by relief in the crossover relief valve 33 noticeably occurs in many cases. In this case, the minimum tilting angles q1min2 and q2min2 calculated in the minimum tilt calculators 111*a* and 112*a* concerned which utilize the vehicle speed can be made larger, which accordingly leads to an improved performance and is thus effective.

The invention claimed is:

1. A working fluid cooling control system for a construction machine having variable displacement type hydraulic pump, a plurality of members to be operated by said hydraulic pump, a heat exchanger for cooling a working fluid as an operating medium discharged from said hydraulic pump, a plurality of control valves for controlling respective flows of the working fluid delivered from said hydraulic pump to control the operation of the corresponding members to be operated, and a plurality of operation means provided for said plural control valves, respectively, the capacity of said hydraulic pump being increased depending on an increase in the operative amount of said plural operation means while the capacity of said hydraulic pump being decreased to a preset amount of a minimum capacity when said plural members to be operated enter an unoperated state, wherein the working fluid cooling control system comprises:

first detection means for detecting an operation pattern corresponding to a rise in temperature of said working fluid from among operation patterns associated with said plural members to be operated; and pump flow rate increasing means which increases the capacity of said hydraulic pump so as to increase an average flow rate of the working fluid passing through said heat exchanger when said first detection means detects the operation pattern corresponding to a rise in temperature of said working fluid, said first detection means being configured to detect, as the operation pattern corresponding to a rise in temperature of the working fluid, at least one of two operation patterns, one being a first operation pattern such that an operation speed of one of said plural members to be operated having a higher frequency of heavy loading than at least one of the other members increases, and the other being a second operation pattern such that a particular operation mode is selected by a selector means among operation modes associated with said plural members to be operated, said particular operation mode providing a higher frequency of heavy loading than at least one of the other operation modes.

2. The working fluid cooling control system for a construction machine according to claim 1 wherein:

said selector means is capable of selecting an operation mode associated with using a crusher, as an attachment and said first detection means detects said operation mode associated with using a crusher as said operation mode having higher frequency of heavy loading.

3. The working fluid cooling control system for a construction machine according to claim 1, wherein the working fluid cooling control system for a construction machine further comprises second detection means for detecting a temperature of said working fluid, and wherein said pump flow rate increasing means increase the capacity of said hydraulic pump on the basis of both the operation pattern detected by said first detection means and the temperature of the working fluid detected by said second detection means.

4. The working fluid cooling control system for a construction machine according to claim 3, wherein said pump flow rate increasing means comprise:

means for calculating a first minimum capacity on the basis of the operation pattern detected by said first detection means;

means for calculating a second minimum capacity on the basis of the temperature of the working fluid detected by said second detection means;

means for selecting the larger capacity of said first and second minimum capacities; and means for changing the capacities of said hydraulic pumps on the basis of the selected minimum capacity.

5. A working fluid cooling control system for a construction machine comprising a plurality of variable displacement type hydraulic pumps, a plurality of members to be operated by each of said plural hydraulic pumps, a heat exchanger for cooling a working fluid as an operating medium discharged from said plural hydraulic pumps, a plurality of control valves for controlling respective flows of the working fluid delivered from said plural hydraulic pumps to control the operation of the corresponding members to be operated, and a plurality of operation means provided for said plural control valves, respectively, the capacities of said plural hydraulic pumps being increased depending on an increase in the operative amount of said plural operation means while the capacities of said plural hydraulic pumps being reduced to a preset amount of a minimum capacity when said plural members to be operated enter an unoperated state, characterized by further comprising:

first detection means for detecting an operation pattern corresponding to a rise in temperature of said working fluid from among operation patterns associated with said plural members to be operated; and pump flow rate increasing means which increase the capacity of at least one of said plural hydraulic pumps to increase an average flow rate of the working fluid passing through said heat exchanger when said first detection means detects the operation pattern corresponding to a rise in temperature of said working fluid, said first detection means being configured to detect, as the operation pattern corresponding to a rise in temperature of the working fluid, at least one of two operation patterns, one being a first operation pattern such that an operation speed of one of said plural members to be operated having a higher frequency of heavy loading increases, and the other being a second operation pattern such that a particular operation mode is selected by a selector means among plural operation modes associated with said plural members to be operated, said particular operation mode providing a higher frequency of heavy loading, said pump flow rate increasing means being configured to increase the capacity of the hydraulic pump used for the operation pattern detected by said first detection means among said plurality of pumps.

6. The working fluid cooling control system for a construction machine according to claim 5, wherein:

said pump flow rate increasing means increases, when said first operation pattern is detected, not only the capacity of the hydraulic pump used in the first operation pattern, but also the capacity of another hydraulic pump other than said hydraulic pump.

7. The working fluid cooling control system for a construction machine according to claim 1, wherein:

said plurality of members to be operated includes a hydraulic motor for traveling, said construction machine includes a travel structure driven by said hydraulic motor, said first detection means being configured to detect an operation pattern in which said vehicle speed increases, as said operation pattern in which the operation speed of a member to be operated has a higher frequency of heavy loading.

* * * * *